(12) United States Patent
Li et al.

(10) Patent No.: US 11,565,914 B2
(45) Date of Patent: Jan. 31, 2023

(54) HAND LIFTING DEVICE AND PROJECTION APPARATUS USING THE SAME

(71) Applicant: Coretronic Corporation, Hsin-Chu (TW)

(72) Inventors: Chang-Ching Li, Hsin-Chu (TW); Ning Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 581 days.

(21) Appl. No.: 16/708,279

(22) Filed: Dec. 9, 2019

(65) Prior Publication Data
US 2020/0189885 A1 Jun. 18, 2020

(30) Foreign Application Priority Data
Dec. 14, 2018 (CN) .......................... 201822098567.3

(51) Int. Cl.
*A45F 3/14* (2006.01)
*B66C 1/16* (2006.01)
*B66C 1/18* (2006.01)
*H04N 9/31* (2006.01)

(52) U.S. Cl.
CPC .................. *B66C 1/16* (2013.01); *A45F 3/14* (2013.01); *B66C 1/18* (2013.01); *H04N 9/3144* (2013.01); *H04N 9/3173* (2013.01); *A45F 2003/142* (2013.01); *A45F 2200/05* (2013.01)

(58) Field of Classification Search
CPC .................. A45F 3/14; A45F 2003/142; A45F 2005/1013; A45F 2200/05; A45C 13/30; H04N 9/3173
USPC .................. 294/139, 149–151, 153, 156, 165
See application file for complete search history.

(56) References Cited

U.S. PATENT DOCUMENTS

| 2,565,006 | A | * | 8/1951 | Trickey | A45C 11/38 |
| | | | | | 396/420 |
| 3,012,809 | A | * | 12/1961 | Tremaine | A45F 5/10 |
| | | | | | 294/157 |
| 5,238,162 | A | * | 8/1993 | LaCivita | A63B 47/00 |
| | | | | | 206/315.9 |
| 6,086,124 | A | * | 7/2000 | Wang | A45F 3/14 |
| | | | | | 215/396 |
| 8,608,257 | B2 | * | 12/2013 | Li | G03B 21/145 |
| | | | | | 312/10.1 |
| 8,616,600 | B2 | * | 12/2013 | Owen | A63C 11/021 |
| | | | | | 294/154 |
| 9,411,371 | B1 | * | 8/2016 | Goren | G06F 1/1632 |

(Continued)

FOREIGN PATENT DOCUMENTS

CN 205863076 1/2017

*Primary Examiner* — Dean J Kramer
(74) *Attorney, Agent, or Firm* — JCIPRNET (57) ABSTRACT

A hand lifting device and a projection apparatus are provided. The hand lifting device is adapted to carry an object, and includes a support pad and a carrying strap. The support pad has a first surface and a second surface opposite to each other, and has two first connecting portions. The carrying strap has two end portions, and the two end portions respectively have a second connecting portion. The carrying strap is configured to partially surround the object, such that the second connecting portions of the carrying strap are respectively detachably connected to the first connecting portions of the support pad. The projection apparatus comprises the above hand lifting device and a projector.

20 Claims, 6 Drawing Sheets

(56) References Cited

U.S. PATENT DOCUMENTS

| | | | | |
|---|---|---|---|---|
| 2014/0084614 A1* | 3/2014 | Ganaza | ................ | A45F 5/1026 294/150 |
| 2017/0055688 A1* | 3/2017 | Lewis | ...................... | A45F 5/10 |

\* cited by examiner

HAND LIFTING DEVICE AND PROJECTION APPARATUS USING THE SAME

CROSS-REFERENCE TO RELATED APPLICATION

This application claims the priority benefit of China application serial no. 201822098567.3, filed on Dec. 14, 2018. The entirety of the above-mentioned patent application is hereby incorporated by reference herein and made a part of this specification.

BACKGROUND

Technical Field

The invention relates to a hand lifting device, and particularly relates to a projection apparatus using the hand lifting device.

Description of Related Art

Along with a design trend of lightness, slimness, shortness and smallness of most electronic devices, usage places of more and more electronic devices such as projectors are no longer limited to just one place. Volumes and weights of these electronic devices may be decreased for users' convenience to carry them around for multi-place usage. For example, a projector may be moved from home to a work place for usage.

However, most electronic devices may still have considerable volumes and weights, and the carrying bags conventionally used do not fit well with various electronic devices of different volumes and weights. Furthermore, there are many inconveniences when putting the electronic devices into the carrying bags or taking the same out of the carrying bags, and there is a risk that the carrying bags may break and thus the electronic devices may fall off. Moreover, it is inconvenient to carry the electronic device by hand.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a hand lifting device configured to help users to carry objects.

The invention is directed to a projection apparatus which is easy to be carried.

Other objects and advantages of the invention may be further illustrated by the technical features broadly embodied and described as follows.

In order to achieve one or a portion of or all of the objects or other objects, an embodiment of the invention provides a hand lifting device adapted to carry an object. The hand lifting device includes a support pad and a carrying strap. The support pad has a first surface and a second surface opposite to each other, and comprises two first connecting portions. When the support pad is fixed to the object, the first surface of the support pad faces the object, and the first connecting portions are disposed on the second surface of the support pad. The carrying strap has two end portions, and the two end portions respectively comprise a second connecting portion. The carrying strap is configured to at least partially surround the object, such that the second connecting portions of the two end portions of the carrying strap are respectively detachably connected to the first connecting portions of the support pad.

In order to achieve one or a portion of or all of the objects or other objects, an embodiment of the invention provides a projection apparatus including a projector and a hand lifting device. The projector has a bottom surface, and the hand lifting device is configured to carry the projector. The hand lifting device includes a support pad and a carrying strap. The support pad has a first surface and a second surface opposite to each other, and comprises two first connecting portions. When the support pad is fixed to the projector, the first surface of the support pad faces the bottom surface of the projector, and the first connecting portions are disposed on the second surface of the support pad. The carrying strap has two end portions, and the two end portions respectively comprise a second connecting portion. The carrying strap is configured to at least partially surround the projector, such that the second connecting portions of the two end portions of the carrying strap are respectively detachably connected to the first connecting portions of the support pad.

According to the above description, the aforementioned hand lifting device is adapted to lift various objects, and may help the user to carry various objects. Moreover, since the support pad contacts the bottom surface of the projector, and the carrying strap may partially surround the projector, a larger connection area between the hand lifting device and the projector may be achieved, which may be useful in carrying the projector stably.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
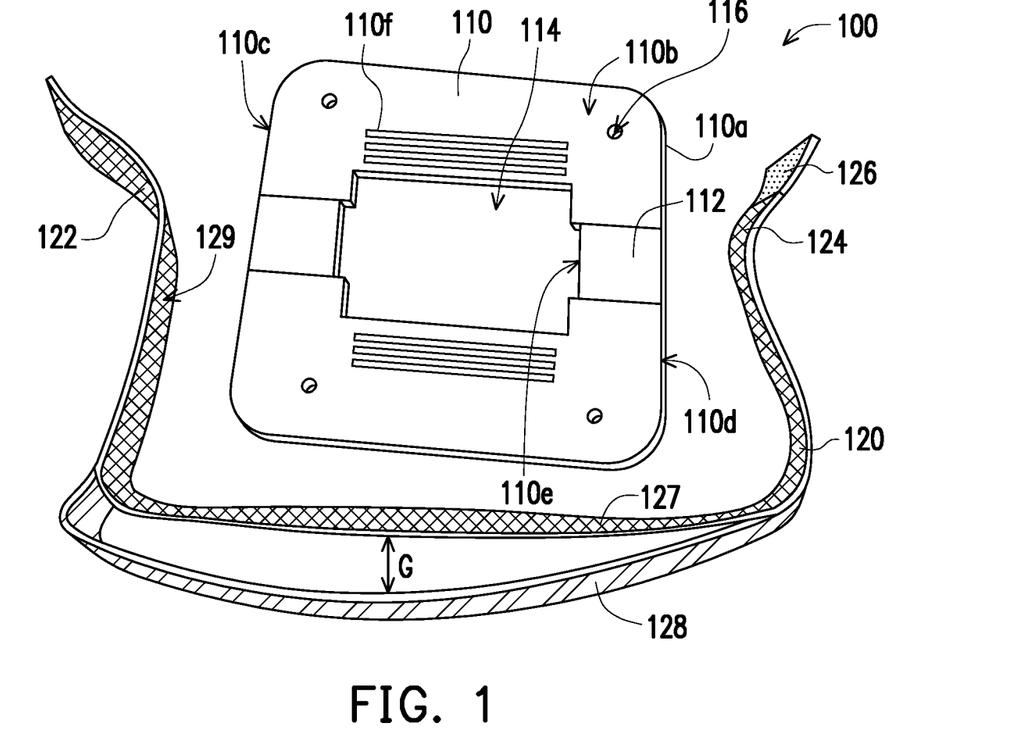
FIG. 1 is an exploded view of a hand lifting device according to an embodiment of the invention.
Figure 2:
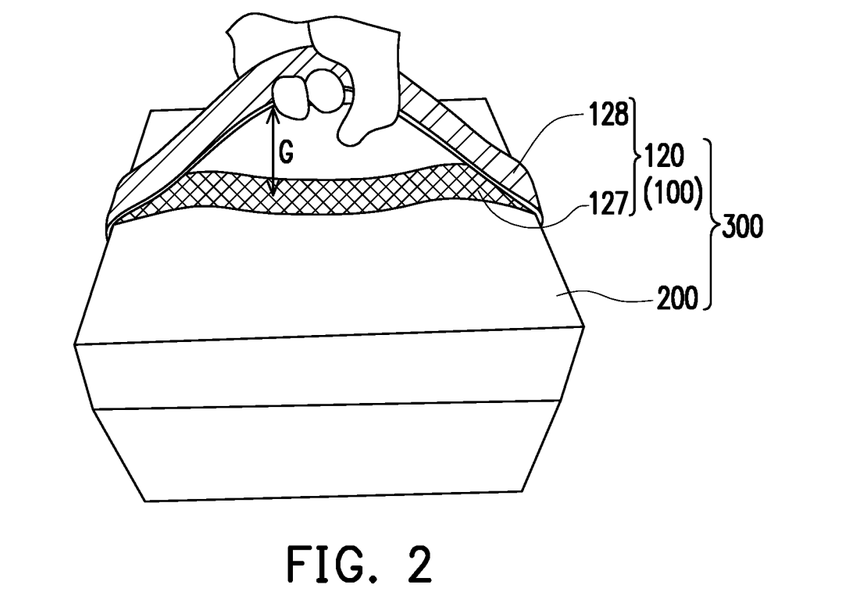
FIG. 2 is a schematic view of a user using the hand lifting device of FIG. 1 to carry an object.

FIG. 1 is an exploded view of a hand lifting device according to an embodiment of the invention. FIG. 2 is a schematic view of a user using the hand lifting device of FIG. 1 to carry an object. Referring to FIG. 1 and FIG. 2, the hand lifting device 100 is used for carrying an object, and the object is, for example, a projector 200, or other electronic or non-electronic device, which is not limited in the application.

In some embodiments, the hand lifting device 100 includes a support pad 110 and a carrying strap 120. The support pad 110 has a first surface 110a and a second surface 110b opposite to each other, and comprises two first connecting portions 112. Moreover, the support pad 110 includes a first side edge 110c, a second side edge 110d and an opening 114 located between the first side edge 110c and the second side edge 110d. The first connecting portion 112 is located on the second surface 110b and between the first side edge 110c and the opening 114, and the other first connecting portion 112 is located on the second surface 110b and between the opening 114 and the second side edge 110d.

In some embodiments, the carrying strap 120 has two end portions 122 and 124, and each of the two end portions 122 and 124 has a second connecting portion 126. The carrying strap 120 may at least partially surround the object, and the two second connecting portions 126 of the two end portions 122 and 124 of the carrying strap 120 are respectively detachably connected to the first connecting portions 112 of the support pad 110.

In the embodiment, a material of the support pad 110 may be metal, plastic or the support pad 110 may be sewed from cloth. In other embodiments, the material and manufacturing method of the support pad 110 may also be selected according to various requirements based on the strength, hardness, cushioning, etc.

The carrying strap 120 includes a carrying strap main body 127 between the two end portions 122 and 124, and the carrying strap main body 127 may surround the object to preliminarily fix the object. When the two second connecting portions 126 at the two end portions 122 and 124 of the carrying strap 120 are respectively connected to the two first connecting portions 112 of the support pad 110, the user may lift the object to be carried by lifting the carrying strap main body 127, so as to lift and move the object.

In some embodiments, the carrying strap 120 further includes a carrying handle 128 fixedly connected to the carrying strap main body 127, and a gap G may be formed between the carrying handle 128 and the carrying strap main body 127. The user may put a hand in the gap G between the carrying handle 128 and the carrying strap main body 127 to hold the carrying handle 128, so as to conveniently lift and carry the object by using the hand lifting device 100. In some embodiments, two ends (not shown in FIG. 1) of the carrying handle 128 may be sewed with the carrying strap main body 127, so as to form the gap G between the carrying handle 128 and the carrying strap main body 127. In other embodiments, the carrying handle 128 and the carrying strap main body 127 may also be designed to be formed integrally according to an actual demand or otherwise properly designed to form the gap G between the carrying handle 128 and the carrying strap main body 127. In some embodiments, materials of the carrying handle 128 and the carrying strap main body 127 may be identical or different.

In some embodiment, the carrying strap 120 may be made of cloth, and when the user holds the carrying handle 128 to lift the object, due to the self-weight of the object, a pressure may be exerted on the first connecting portions 112 and the second connecting portions 126 connected with each other, so as to enhance the connection strengthen between the first connecting portions 112 and the second connecting portions 126. Moreover, the carrying strap 120 may be conformed to a shape corresponding to that of the object, so as to be closely attached to the object, thereby preventing the object from falling out of the hand lifting device 100. Moreover, in order to make the assembly and disassembly of the first connecting portions 112 and the second connecting portions 126 more convenient, in some embodiments, for example, the first connecting portions 112 and the second connecting portions 126 may be Velcro tapes. Those skilled in the art may use other components to serve as the connecting portions according to an actual requirement, and for example fastening members may be used to serve as the connecting portions.

When the hand lifting device 100 is applied to an object, a combination of the hand lifting device 100 and the object and a carrying method thereof are described in detail below. It should be noted that although the to-be-carried object is the projector 200 in the following description, the invention is not limited thereto, and the object may also be other electronic device or non-electronic device. In brief, the hand lifting device 100 may be applied to objects of different volumes, shapes or weights, and the invention is not limited to the object described in the specification.

FIG. 3A to FIG. 3I are schematic diagrams of an assembling flow of the projector and the hand lifting device.

Figure 3A:
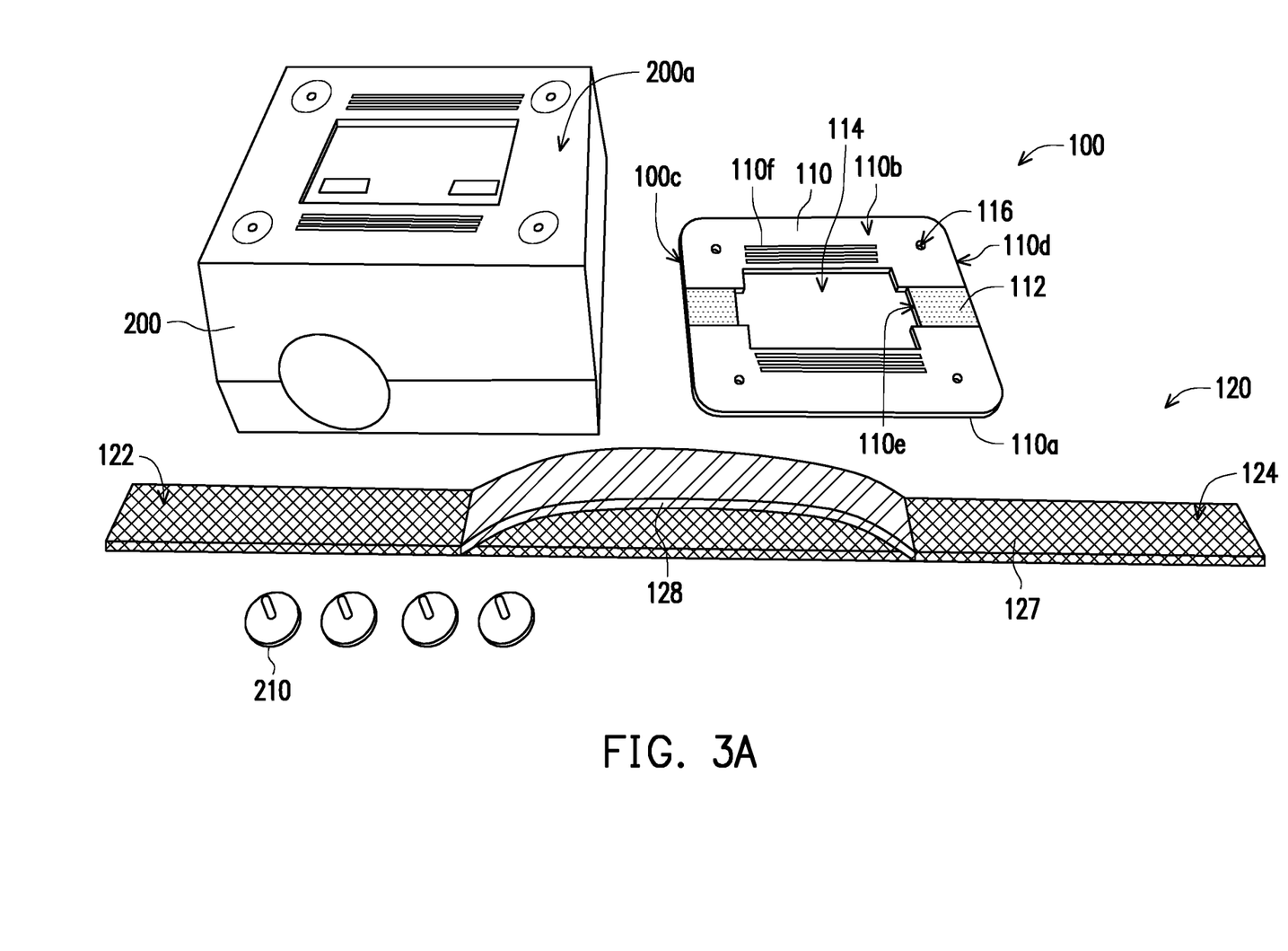
FIG. 3A to FIG. 3I are schematic diagrams of an assembling flow of a projector and the hand lifting device.
Figure 3B:
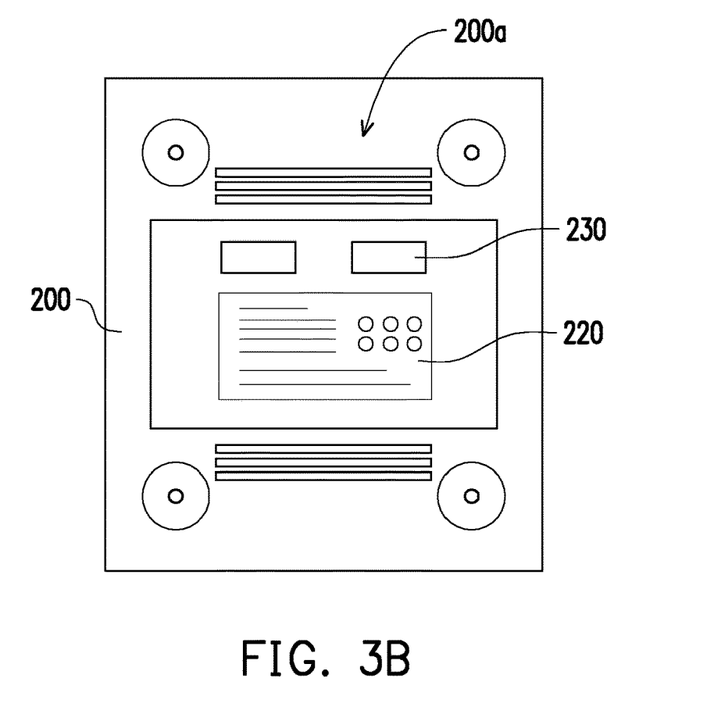

Referring to FIG. 3A and FIG. 3B, in some embodiments, the hand lifting device 100 may be disassembled into various parts, and the carrying strap 120 and the support pad 110 are separately placed. A plurality of footstands 210 may be disassembled from a main body of the projector 200.

Figure 3C:
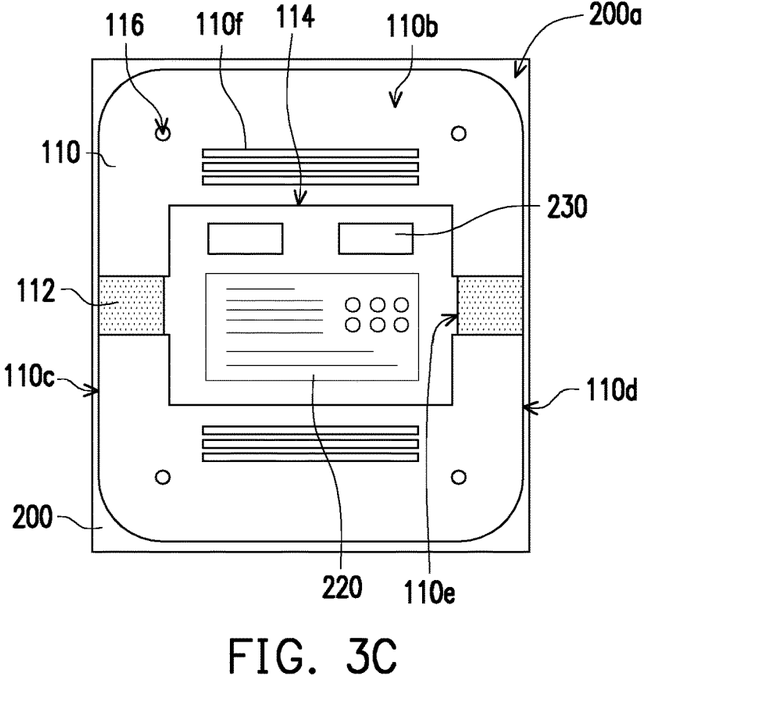
Figure 3D:
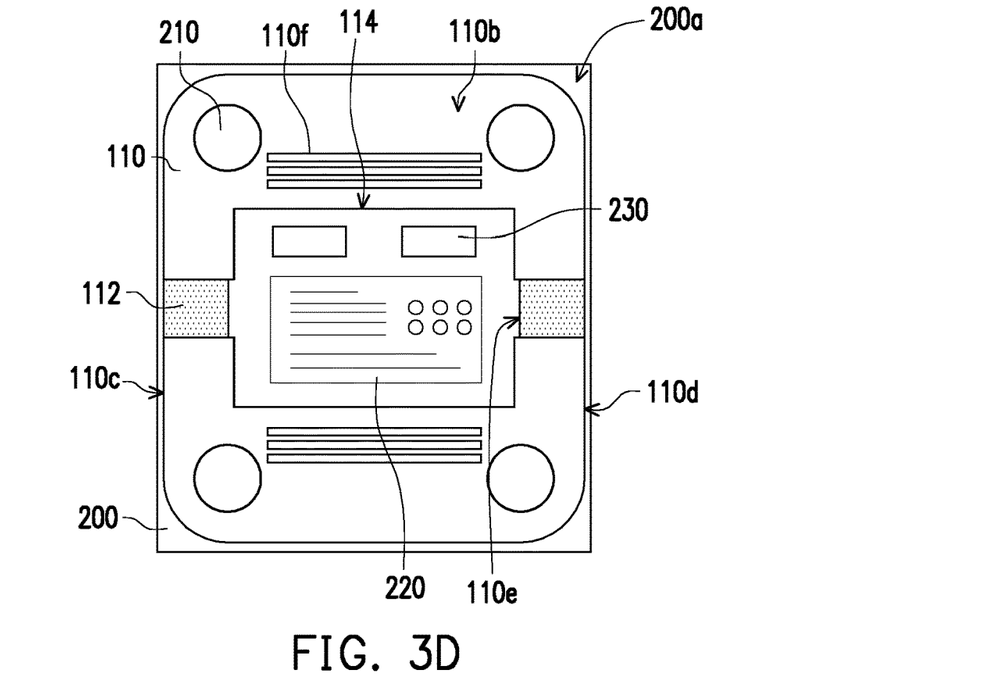

As shown in FIG. 3C and FIG. 3D, in some embodiments, the footstands 210 are assembled to the main body of the projector 200 after penetrating through the support pad 110, such that the support pad 110 is fixed to the projector 200.

In detail, in some embodiment, a plurality of fixing holes 116 may be formed on the support pad 110. When the support pad 110 is fixed to the projector 200, positions of the fixing holes 116 are aligned with positions of the footstands 210 on the projector 200, so that the footstands 210 may penetrate through the fixing holes 116 of the support pad 110, and then be fixed to the projector 200. In other embodiments, for example, in case that the support pad 110 is a plastic or metal material, the fixing holes 116 of the support pad 110 may be configured with internal threads, and the footstands 210 may be configured with external threads. In the embodiment, the footstands 210 may be used to fix the support pad 110 to the projector 200 in a screw-locking manner (for example, thread connection).

In some embodiments, when the support pad 110 is fixed to a bottom surface 200a of the projector 200, the first surface 110a of the support pad 110 is located between the bottom surface 200a of the projector 200 and the second surface 110b of the support pad 110, and the first connecting portions 112 of the support pad 110 are disposed on the second surface 110b of the support pad 110. Namely, the first connecting portions 112 face away from the bottom surface 200a of the projector 200. Moreover, a space (not shown) is formed between the first surface 110a of the support pad 110 and the bottom surface 200a of the projector 200.

Particularly, in some embodiments, the projector 200 further includes a tag paper 220 attached on the bottom surface 200a, or a loudspeaker (not shown) of the projector 200 is designed to send sound from the bottom surface 200a of the projector 200. In case that the projector 200 includes the loudspeaker, the bottom surface 200a of the projector 200 may include a plurality of speaker holes for the loudspeaker. As shown in FIG. 3D, the opening 114 of the support pad 110 may expose the tag paper 220 or the speaker holes 230 of the loudspeaker.

Figure 3E:
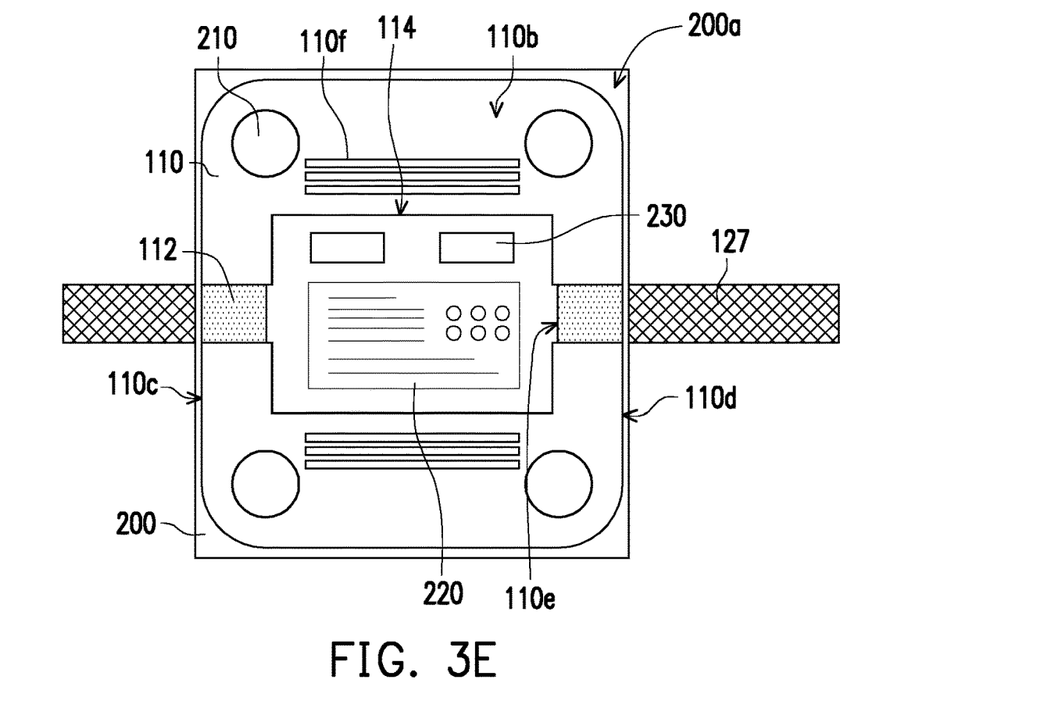

As shown in FIG. 3E, the carrying strap 120 is placed on a plane (for example, a desktop or a ground surface), and the support pad 110 is fixed to the bottom surface 200a of the projector 200 through the footstands 210, and then the projector 200 and the support pad 100 are altogether placed on the carrying strap 120, where the bottom surface 200a of the projector 200, the second surface 100b of the support pad 110 and the first connecting portions 112 disposed on the second surface 110b all face to the user.

Figure 3F:
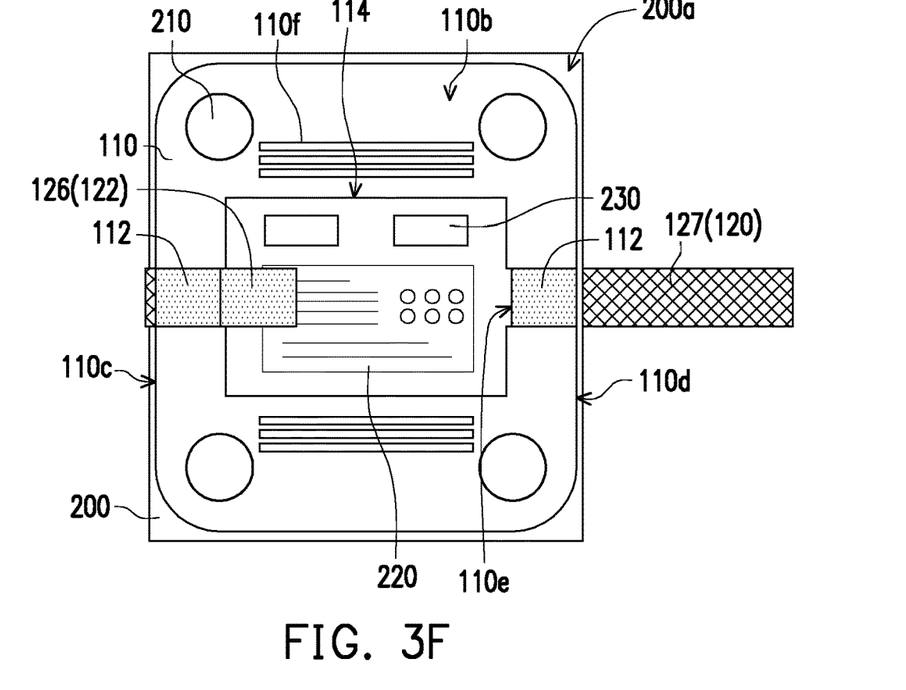
Figure 3G:
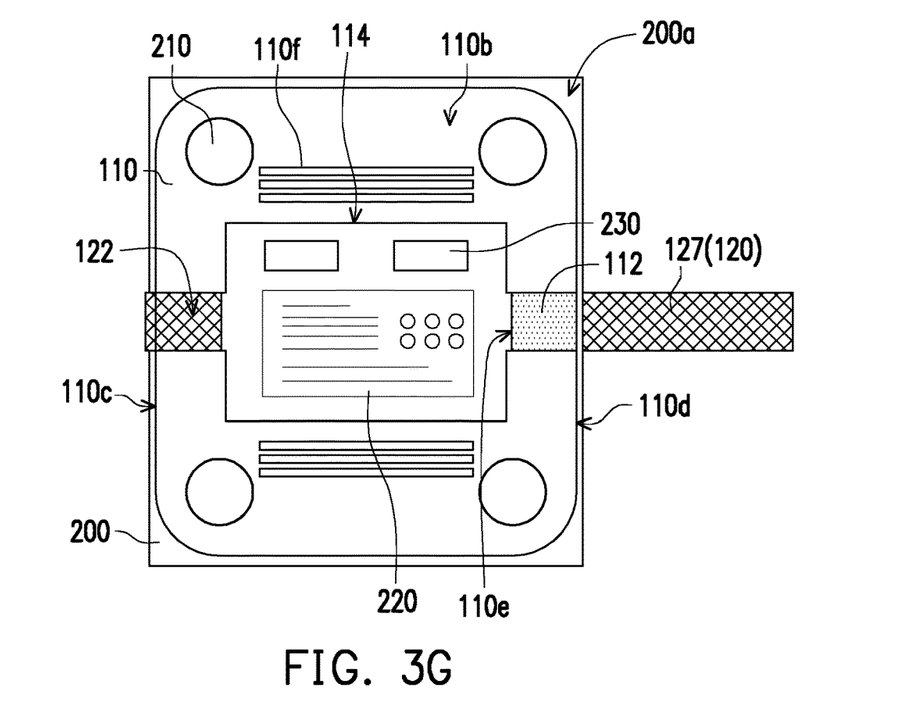

As shown in FIG. 3F and FIG. 3G, the end portion 122 of the carrying strap 120 penetrates through the space between the support pad 110 and the bottom surface 200a of the projector 200 from the first side edge 110c of the support pad 110 to exit from the opening 114, and after being reversely folded, the second connecting portion 126 is connected to the first connecting portion 112 on the second surface 110b located between the first side edge 110c and the opening 114, i.e. to adhere the Velcro tapes.

Figure 3H:
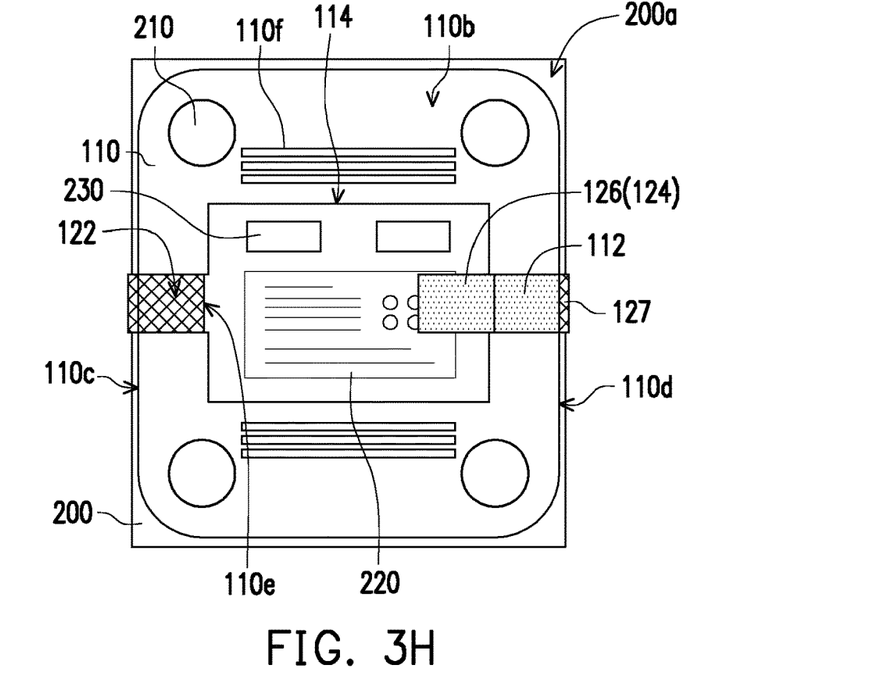
Figure 3I:
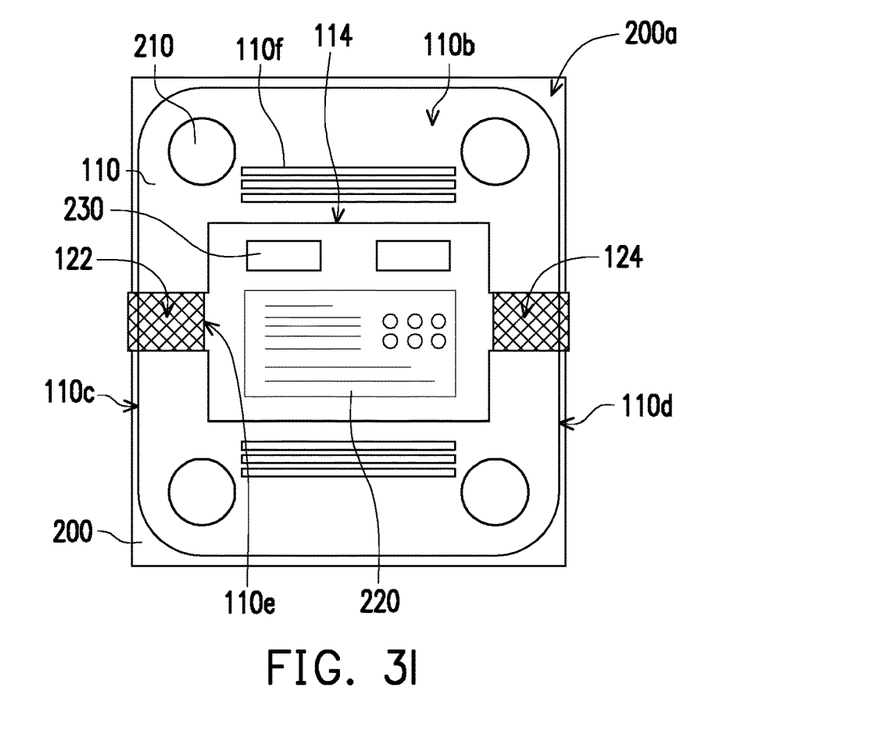

As shown in FIG. 3H and FIG. 3I, the end portion 124 of the carrying strap 120 penetrates through the space between the support pad 110 and the bottom surface 200a of the projector 200 from the second side edge 110d of the support pad 110 to exit from the opening 114, and after being reversely folded, the second connecting portions 126 is connected to the first connecting portion 112 on the second surface 110b located between the second side edge 110d and the opening 114, i.e. to adhere the Velcro tapes.

Particularly, in some embodiment, the support pad 110 further includes two recess portions 110e located at the periphery of the opening 114. For example, in the embodiment that the opening 114 has a rectangular contour, the two recess portions 110e may be respectively located at two parallel side edges of the rectangular opening 114, as shown in FIG. 3I. The two end portions 122 and 124 of the carrying strap 120 respectively exit from the opening 114 along the recess portions 110e, such that the portions of the carrying strap 120 exit from the opening 114 and reversely folded may be located in the recess portions 110e. In this way, the carrying strap 120 is not easily displaced relative to the support pad 110. In the embodiment, such as the recess portion 110e near the second side edge 110d, the recess portion 110e is formed by a rectangular region encircled by the opening 114, the first connecting portions 112 and the support pad 110. In the embodiment, the opening 114 has a square shape, and the two recess portions 110e are respectively located at two parallel side edges of the square opening 114. In the embodiment, the two recess portions 110e are respectively recessed towards the first side edge 110c and the second side edge 110d of the support pad 110. However, in other embodiments, the opening 114 may have other shapes, for example, a round shape, and the recess portions 110e are respectively recessed towards the first side edge 110c and the second side edge 110d from two opposite end of a diameter of the round opening 114. In other embodiments, the shape of the opening 114 may also be other suitable shapes, and the number of the opening 114 may also be increased or decreased according to an actual requirement, which is not limited to the embodiment of the invention. A proper shape and/or proper number of the recess portions 110e may result in a fact that the carrying strap 120 is not easily displaced relative to the support pad 110 and the projector 200.

In this way, a projection apparatus 300 shown in FIG. 2 is constituted.

In a general situation, the projection apparatus 300 may be placed on a plane (for example, a desktop or a ground surface) to project onto a screen with carrying strap 120 of the hand lifting device 100 surrounding the projector 200. According to FIG. 2, it is known that the carrying strap 120 surround the projector 200 by the sides where a projection lens is not disposed, so that the hand lifting device 100 may not interfere with the projection lens of the projector 200.

Moreover, a plurality of heat dissipating holes 110f may be configured on the support pad 110, and the heat dissipating holes 110f may correspond to a cooling portion (such as, a cooling portion including heat dissipating holes) of the projector 200 to facilitate heat dissipation for the projector 200. Certainly, a plurality of heat dissipating holes 129 may also be configured on the carrying strap 120 to facilitate heat dissipation for the projector 200.

When the projector 200 is carried, as shown in FIG. 2, the user may put a hand in the gap G between the carrying handle 128 and the carrying strap main body 127 to hold the carrying handle 128, so as to lift and carry the projector 200.

Referring to FIG. 2 and FIG. 3I, in some embodiments, when the user lifts the projector 200, the first connecting portions 112 and the second connecting portions 126 are connected with each other by reversely folding the two end portions 122 and 124 of the carrying strap 120, and due to the weight of the projector 200, a force may be exerted on the first connecting portions 112 and the second connecting portions 126, and thus the carrying strap main body 127 may also be deformed partially resulting from the weight of the projector 200. As such, the carrying strap main body 127 is more closely attached to a sidewall of the projector 200. Moreover, due to the weight of the projector 200, a bonding effect between the first connecting portions 112 and the second connecting portions 126 may be strengthened. In this way, an overturning of the projector 200 caused from an insufficient bonding strength during the lifting and carrying may be prevented, and a projector 200 falling from the hand lifting device 100 due to a looseness may also be avoided.

In summary, the hand lifting device of the invention is applied to objects of various shapes and weights, and it is convenient for users to use the hand lifting device to carry the objects by using a single hand.

Moreover, since the end portions of the carrying strap are reversely folded after passing through the space between the support pad and the object to connect the first connecting portions and the second connecting portions, the carrying strap main body contacts both the first surface and the second surface of the support pad, and the carrying strap main body surrounds the object in a larger contact area, the user may stably lift and carry the object.

Further, the hand lifting device has advantages of easy assembly and disassembly, and it is convenient for the user to repair or replace the hand lifting device when it wears out.

The portability the projection apparatus using the hand lifting device may be desirable.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A hand lifting device, adapted to carry an object, the hand lifting device comprising:
    a support pad, having a first surface and a second surface opposite to each other, and the support pad comprising two first connecting portions, wherein when the support pad is fixed to the object, the first surface of the support pad faces the object, and the first connecting portions are disposed on the second surface of the support pad; and
    a carrying strap, having two end portions, wherein the two end portions respectively comprise a second connecting portion, and the carrying strap is configured to at least partially surround the object, such that the second connecting portions of the two end portions of the carrying strap are respectively detachably connected to the first connecting portions of the support pad,
    wherein the object comprises a plurality of footstands, the support pad comprises a plurality of fixing holes, and the plurality of footstands penetrate through the fixing holes of the support pad and the plurality of footstands are detachably fixed to the object, such that the first surface of the support pad is between the object and the second surface of the support pad, and a space is formed between the first surface of the support pad and the object.

2. The hand lifting device of claim 1, wherein the carrying strap comprises a carrying strap main body located between the two end portions, the carrying strap main body is configured to surround the object to fix the object, and when the second connecting portions are connected to the first connecting portions of the support pad, the carrying strap main body is configured to lift the object.

3. The hand lifting device of claim 1, wherein the carrying strap comprises a carrying strap main body located between the two end portions and a carrying handle fixedly connected to the carrying strap main body, and a gap is formed between the carrying handle and the carrying strap main body.

4. The hand lifting device of claim 3, wherein two ends of the carrying handle are sewed with the carrying strap main body, or the carrying handle and the carrying strap main body are formed integrally.

5. The hand lifting device of claim 1, wherein the support pad comprises a first side edge, a second side edge and an opening between the first side edge and the second side edge, one of the first connecting portions is located on the second surface and between the first side edge and the opening, and the other one of the first connecting portions is located on the second surface and between the opening and the second side edge, and
    wherein the two end portions of the carrying strap respectively from the first side edge and the second side edge of the support pad penetrate through the space between the support pad and the object, exit from the opening, and are respectively fixed to the first connecting portions of the support pad after being reversely folded.

6. The hand lifting device of claim 5, wherein the support pad further comprises two recess portions located at a periphery of the opening, and
    wherein the two end portions of the carrying strap respectively exit from the opening along the recess portions, such that at least a part of the carrying strap is located in the recess portions.

7. The hand lifting device of claim 1, wherein the first connecting portions and the second connecting portions are Velcro tapes.

8. The hand lifting device of claim 1, wherein the support pad further comprises a plurality of heat dissipating holes aligned with a cooling portion of the object.

9. A hand lifting device, adapted to carry an object, the hand lifting device comprising:

a support pad, having a first surface and a second surface opposite to each other, and the support pad comprising two first connecting portions, wherein when the support pad is fixed to the object, the first surface of the support pad faces the object, and the first connecting portions are disposed on the second surface of the support pad; and a carrying strap, having two end portions, wherein the two end portions respectively comprise a second connecting portion, and the carrying strap is configured to at least partially surround the object, such that the second connecting portions of the two end portions of the carrying strap are respectively detachably connected to the first connecting portions of the support pad, wherein the carrying strap further comprises a plurality of heat dissipating holes for cooling the object.

10. A projection apparatus, comprising:
a projector, having a bottom surface; and
a hand lifting device, configured to carry the projector, and the hand lifting device comprising:
  a support pad, having a first surface and a second surface opposite to each other, and the support pad comprising two first connecting portions, wherein when the support pad is fixed to the projector, the first surface of the support pad faces the bottom surface of the projector, and the first connecting portions are disposed on the second surface of the support pad; and
  a carrying strap, having two end portions, wherein the two end portions respectively comprise a second connecting portion, and the carrying strap is configured to at least partially surround the projector, such that the second connecting portions of the two end portions of the carrying strap are respectively detachably connected to the first connecting portions of the support pad,
  wherein the projector comprises a plurality of footstands, the support pad comprises a plurality of fixing holes, and the plurality of footstands penetrate through the fixing holes of the support pad and the plurality of footstands are detachably fixed to the projector, such that the first surface of the support pad is between the bottom surface of the projector and the second surface of the support pad, and a space is formed between the first surface of the support pad and the bottom surface of the projector.

11. The projection apparatus of claim 10, wherein the carrying strap comprises a carrying strap main body located between the two end portions, the carrying strap main body is configured to surround the projector to fix the projector, and when the second connecting portions are connected to the first connecting portions of the support pad, the carrying strap main body is configured to lift the projector.

12. The projection apparatus of claim 10, wherein the carrying strap comprises a carrying strap main body located between the two end portions and a carrying handle fixedly connected to the carrying strap main body, and a gap is formed between the carrying handle and the carrying strap main body.

13. The projection apparatus of claim 12, wherein two ends of the carrying handle are sewed with the carrying strap main body, or the carrying handle and the carrying strap main body are formed integrally.

14. The projection apparatus of claim 10, wherein the support pad comprises a first side edge, a second side edge and an opening between the first side edge and the second side edge, one of the first connecting portions is located on the second surface and between the first side edge and the opening, and the other one of the first connecting portions is located on the second surface and between the opening and the second side edge, and
  wherein the two end portions of the carrying strap respectively from the first side edge and the second side edge of the support pad penetrate through the space between the support pad and the projector, exit from the opening, and are respectively fixed to the first connecting portions of the support pad after being reversely folded.

15. The projection apparatus of claim 14, wherein the support pad further comprises two recess portions located at a periphery of the opening, and
  wherein the two end portions of the carrying strap respectively exit from the opening along the recess portions, such that at least a part of the carrying strap is located in the recess portions.

16. The projection apparatus of claim 14, wherein the projector further comprises a tag paper adhered onto the bottom surface, and the opening of the support pad exposes the tag paper or a loudspeaker.

17. The projection apparatus of claim 14, wherein the projector further comprises a loudspeaker configured to send sound from the bottom surface, the bottom surface comprises at least one speaker hole aligned with the loudspeaker, and the opening of the support pad exposes the at least one speaker hole.

18. The projection apparatus of claim 10, wherein the first connecting portions and the second connecting portions are Velcro tapes.

19. The projection apparatus of claim 10, wherein the support pad further has a plurality of heat dissipating holes aligned with a cooling portion of the projector.

20. A projection apparatus, comprising:
a projector, having a bottom surface; and
a hand lifting device, configured to carry the projector, and the hand lifting device comprising:
  a support pad, having a first surface and a second surface opposite to each other, and the support pad comprising two first connecting portions, wherein when the support pad is fixed to the projector, the first surface of the support pad faces the bottom surface of the projector, and the first connecting portions are disposed on the second surface of the support pad; and
a carrying strap, having two end portions, wherein the two end portions respectively comprise a second connecting portion, and the carrying strap is configured to at least partially surround the projector, such that the second connecting portions of the two end portions of the carrying strap are respectively detachably connected to the first connecting portions of the support pad,
wherein the carrying strap further comprises a plurality of heat dissipating holes for cooling the projector.

* * * * *